United States Patent Office 3,188,211

Patented June 8, 1965

3,188,211

PRETREATMENT OF METALLIC BASE MATERIALS TO BE USED IN PHOTOENGRAVING PROCESSES

Michael Kocsuta, Willoughby, Ohio
(327 E. 285th St., Willowick, Ohio)

No Drawing. Filed Apr. 4, 1960, Ser. No. 19,485
19 Claims. (Cl. 96—36)

This invention relates to a process for the manufacture of offset printing plates, engraved plates, printed circuits, name plates, embossing and stamping dies, etc. It also relates to an improved process involving pretreatment of plates which permits the use of various metals for such purposes. It further relates to an improved method of applying a protective coating to metals. This is a continuation-in-part of application Serial No. 710,394, filed on January 22, 1958, and now abandoned.

Generally the steps of preparing a printing plate are as follows:

(1) The plate is grained to provide a rough surface to give improved adhesion of the image-receptive substance to be placed thereon and also to give better water-retaining or grease-resistant surfaces in the case of wet offset printing. Graining is a highly specialized skill and must be done properly to assure effective results.

(2) The plate is then coated with a "resist" which is a light-sensitive material such as ammonium dichromate mixed with albumen, glue, gum, or gelatin, etc.

(3) This coating is dried. The coating and drying are carried out sometimes by placing the plate on a whirler.

(4) After the coating has dried, the image or design which is to be reproduced on the plate is laid over this coating. This image may be in the form of a negative or positive which allows light to shine through either in those areas representing the image, or in the non-image areas. Upon exposure, this light activates the ammonium dichromate, or other substance performing a similar function, so that it acts to harden the albumen, glue, gum, or gelatin, etc., in those areas which it strikes. In those areas not receiving light, the albumen, etc., is not hardened.

(5) The plate is then developed by covering with a liquid which dissolves, removes, or washes away the unhardened albumen or other coating material. Thus, if the light was transmitted in the image areas, the hardened areas result in a raised surface which, upon the application of ink, will print the desired image or design.

When the metal in the unprotected areas is to be etched away or recessed, the lateral edges of the hardened coating are very often protected by the application and melting thereon of a powder substance known as "dragon's blood," which is a red pitch taken from East Indian trees, and a solution is applied to the non-protected metal areas to "eat away" the metal for as long as the dragon's blood can protect the hardened coating and metal thereunder.

In the process known as the "deep etching process," the above technique is varied in that the coating in the printing areas or those areas carrying the image is not hardened. Then the soft areas are washed off so as to leave a stencil of the print or desired image. A deep etch solution, generally hydrochloric acid in anhydrous alcohol or glycerine, is thereafter applied to the exposed metal to give an indentation of about 0.001–0.002 inch. This recessed area is then filled with gum arabic, or other material which can be hardened. After the gum arabic is hardened, the hardened albumen areas are removed so that the gum arabic areas give the raised printing or image area.

In present commercial practice high humidity has a very damaging effect on the rate and type of drying of resist coatings. The adhesion and quality of the resist can be so adversely affected by humidity that it is sometimes necesssary to avoid application of the resist during periods of high humidity unless humidity control equipment is used.

As can be seen from the above description, the manufacture of printing plates is a complicated process involving very careful control at the various steps, particularly where the image or print is to be reproduced in very fine detail.

In attempts to improve the receptivity of resist coatings on various metal plates, suggestions have been made for the use of various acidic materials which cause pitting in the metal surface to give a tooth or footing for the resist to become anchored in the metal by having resist in the pits and crevices. This leaves a rough surface in the metal which is undesirable for many subsequent uses of the plates such as printing with engraved plates, etc. Moreover, such practice destroys the metallic lustre of the plate making it much less attractive. Furthermore, when the metal plate actually is a thin foil, such as used in making printed circuits, aluminum foil coverings or coatings, etc., the resultant pits and crevices can cause breakthrough in the foil. Where the pits actually occur in the image areas of a printed circuit which actually are to become conductors this can cause a rupture in the conductor and also can cause variations in the resistance of such conductors eventually causing overheating and burned-out conductors.

In preparing printing plates, engraved plates, or intaglio plates, or printed circuits, either by mechanically gouging, or by pantograph cutting, or by etching, there have been very definite limitations on the accuracy and fidelity of reproducing the desired image. In the case of mechanical gouging, or cutting, this is due to human inability to to produce very fine detail by laborious methods. With regard to etching, the inaccuracy in detail is caused by the fact that the resist or protective coating is so poorly adhered to the metal, or is so soft in the region in contact with the metal that, as the solution eats into the metal, it also creeps under the resist or protective coating layer so that the unetched areas in the metal are not an exact reproduction of the image or print areas desired.

Moreover, in the production of printed, stamped, or embossed products depending on reproduction of a design or image pressed thereon, the rate of producing such articles can be increased tremendously if such impression is received from a roll or cylinder on which the design is imprinted so that the pressing operation is a continuous, uninterrupted one. However, such speedy operation is not always practical in view of the fact that the reproduction of a design or image on a roller or cylindrical form cannot always be done economically or accurately.

One purpose of this invention is to provide a pretreatment of the metal which results in improved adhesion of the resist or protective coating materials.

Another purpose of this invention is to provide a method of applying a resist or protective coating to various metals that gives a more durable coating unaffected by high humidity conditions.

Another purpose of this invention is to give a type of eching such that the printing areas are of the metal itself so that a coating is not required on the printing areas to retain ink.

Another purpose of this invention is to give a process of etching that can be used to reproduce images easily and accurately on cylinders or rolls.

Still another purpose of this invention is to provide a process which can give accurate and faithful reproduction of images even when the etching is carried to depths much greater than previously used, thereby permitting the use of this process for manufacture of embossing rolls, dies for producing printed circuits, dies or molds for injection molding machines, printed circuits, etc.

Still another purpose of this invention is to provide a process which improves the receptivity of various metals to resist coatings without causing pitting of the metal and without destroying the luster and smooth surface of the metal.

These purposes and others which will become obvious upon reading of the invention described herein, can be accomplished by the practice of the present invention.

It has been found that plates of various metals, that is copper, aluminum, magnesium, chromium, and nickel, and non-ferrous alloys thereof, can be used, in accordance with the present invention to reproduce images thereon useful for printing, stamping, molding, etc. The first step involves a pre-treatment of the metal with an aqueous hydrochloric acid solution containing about 30–53 grams of hydrogen chloride per gallon of solution, preferably 44–50 grams, at an elevated temperature of 100° F. to 140° F., preferably 120° F. to 140° F. (Such solutions can be made by using 2.5 to 4 fluid ounces, preferably 3.5–4 ounces, of concentrated hydrochloric acid (36 to 38 percent by weight) per gallon of solution.) With plates made of copper or alloys containing a major proportion of copper, satisfactory results are also obtained with acid concentration as low as one ounce of said hydrochloric acid per gallon of solution (approximately 12 grams of hydrogen chloride per gallon of solution), and also with a contact time as short as one-half minute. Sufficient solution is added to wet the entire plate, and the solution is left in contact with the plate for about 1 to 6 minutes, preferably about 2 to 4 minutes (and even less time with copper, as indicated above), depending on the exact acid concentration, the exact temperature used, and the type of metal used. For example, when the preferred range of acid concentration and the preferred range of temperature are used, the period is advantageously about 1–3 minutes for copper, and about 2–3 minutes for nickel and chromium. With magnesium and aluminum, the period is advantageously about 2 minutes. Then the solution is washed off the plate with water in such a manner as not to lower substantially the temperature of the plate, for example by using water warmed to approximately the same temperature as that of the plate.

The subsequent steps in the preparation of the plate can vary, depending on the type of plate being used and the ultimate purpose for which the plate is to be used. However, the essential steps comprise coating the plate with a protective material or resist while the plate is maintained at a temperature in the range of 100° F. to 140° F., preferably 120° F. to 140° F., allowing the composition to dry, and then allowing the plate to cool to room temperature. When a light-sensitive coating or photo-resist is used, an image is exposed on the coating, for example by placing over the coated area of the plate an image-bearing sheet which will permit the transmission of light in certain areas and thereby permit light to act on the coated composition in those areas so that the image can be reproduced either as a positive or negative in the coated composition on the plate; then the composition is developed to remove the coating in the unhardened areas. Finally, the uncovered areas of the plate are etched to a desired depth.

It has also been found that the method of applying the resist or protective coating to the plate while the plate is maintained at the above temperatures, gives improved adhesion and improved quality of resist or protective coatings. Therefore, this technique also can be used to make tougher coatings of improved adhesion and thereby more accurate plates from aluminum, copper, magnesium, chromium, nickel, and non-ferrous alloys thereof.

While it is not intended that this invention be restricted to any such theory, it is believed that the raised temperature of the metal surface causes the resist or protective coating to harden from the metal surface outwardly through the thickness of resist or coating, whereas the regular system of drying the resist or protective coating layer with the metal at ordinary temperatures results in having the outer surface of the resist harden or dry first and the inner or metal-contacting surface dry last, and possibly not as well as the outer surface. Very likely this latter system leaves the inner surface of the resist softer and more poorly adhered to the metal surface.

In accordance with the practice of this invention, it generally is preferred, in the manufacture of printing plates having raised printing areas, to have the etched area recessed sufficiently so that the coating over the unetched or printing areas can be removed and the raised areas of the unetched metal itself serve as the printing areas. In this way the metal, being much stronger than the composition with which it was coated is less subject to chipping and cracking during abusive printing operations. Apparently because of improved adhesion of the resist or protective coating, the process of this invention permits deeper etching and more accurate reproduction of print, image, or design than has previously been known.

The pretreatment step described above leaves the printing area receptive to inks and excellent results are obtained by using the plate in this manner. Moreover, since the metal image can serve as the printing area, a greater number of copies can be printed without concern over variations or changes in the actual printing. Furthermore, since the plate can be used without fountain solution, this permits the plate to be used for extended periods without periodically having to examine the printed sheets to determine whether "scumming" or intermingling of the water and ink has occurred on the non-printing areas of the plate, which necessitates removal and treatment or replacement of the plate.

Even where it may be desirable to prepare and use the plate in the same manner as presently used with wet offset zinc plates, for example, when only a few copies are to be printed, the present invention offers an advantage in that it permits the use of more economical plates, such as aluminum, and gives improved adhesion of the coating material or resist.

This invention is best illustrated by the following examples. These examples are not intended to serve as limitations on the scope of the invention described herein but are intended as illustrations of various methods in which the invention may be practiced. Unless specifically indicated otherwise, references to parts and percentages are intended to be parts by weight and percentages by weight.

*Example I*

The following procedure is the one generally followed in succeeding examples except for specific variations that are pointed out. The metal plate is placed on a heated steel plate of ¾ inch thickness and having sufficient area to support the entire sheet. This heater plate has heater elements underneath, thermocouple for indicating temperature thereof, controls for adjusting the temperature, and is advantageously placed in an area having good ventilation and protected from light that will affect any photo-resist composition being applied to the plates thereon. The plate is heated in such a manner that the temperature throughout is relatively uniform and not over- or under-heated in any area. Means for measuring the temperature of the sheet are attached or contacted therewith. With the temperature of the plate maintained at about 125° F., the entire area of the plate is treated with aqueous hydrochloric acid solution containing 4 fluid ounces of concentrated hydrochloric acid (36% by weight) per gallon of solution. The solution is of such a temperature that its contact with the plate does not lower the temperature thereof and the plate is maintained at about 125° F. The acid solution is left in contact with the plate for about 4 minutes, after which the solution is washed off with water having a temperature of about 125° F.

The resist composition is applied to the plate while the temperature is maintained at about 125° F. This resist is sprayed on to the plate to give a thin, continuous, uniform coating thereon. After a coating of relatively uniform thickness has been applied, the coating is allowed to dry. The drying is completed within a matter of minutes. The plate is then removed from the heater plate and placed in an area protected against actinic light (or light to which the resist is sensitive) until the plate has reached room temperature. The remaining surfaces of the plate, including the sides and back, are coated with a considerable thickness of asphaltum and dried. A photographic negative bearing the image desired for reproduction is placed on the plate and the plate then placed in a vacuum frame for exposure. The negative with plate underneath is then exposed to actinic light from a 20 ampere carbon arc lamp for six minutes (or other light and period as specified). The plate is then taken out of the vacuum frame and developed with a calcium chloride developer (made by adding 53 ml. of 85% lactic acid to a liter of 40–41° Baumé aqueous calcium chloride solution) or other appropriate developer as specified, until a clear image is obtained; the plate is next washed with alcohol and dried. Then the plate is dipped into a tank or mordant comprising 41° Baumé ferric chloride solution agitated at 80° F., for a period of 15 minutes. Thereafter, the plate is removed from the mordant bath and washed with water to remove the resist layer. The resultant plate, in most of the examples herein, has the image reproduced thereon with printing surfaces raised about 0.006–0.010 inch above the recessed areas.

*Example II*

The following procedure is used in preparing the albumen-dichromate photo-resist solution which is used as the resist composition in many of the examples. Egg albumen crystals (4½ avoirdupois ounces) are placed in a cheesecloth bag and suspended in 22 ounces of water until solved. The bag then is removed without squeezing. A volume of this solution is measured out which contains 3 avoirdupois ounces of albumen. This can be checked by determining the density of the solution and referring to the density chart on page 49 of the book entitled "Photography and Plate Making for Photolithography," by I. H. Sayre, published in 1939 by Lithographic Textbook Publishing Company, Chicago, Illinois. To the quantity of albumen solution containing 3 ounces of albumen, are added 5 liquid ounces of dichromate solution made as follows: 16 avoirdupois ounces of ammonium dichromate are dissolved in 64 fluid ounces of water, the solution is filtered, and water is added slowly until a hydrometer reading indicates that the solution has reached a density of 14.2° Baumé. A small amount of Rhoduline Blue dye is added to give color contrast upon development of the plate.

*Example III*

The following procedure is used in preparing a shellac-dichromate resist composition used in some of the examples: 60 grams of purified, dewaxed shellac are heated with 75 ml. of aqueous ammonia solution (28% ammonia) and 250 ml. of water until dissolved. Then 70 ml. of 3% aqueous ammonium dichromate solution is added and the solution diluted with 100 ml. of 90% ethyl alcohol. A small amount of Malachite Green dye is added to give color contrast upon development of the plate. After the exposure step, the plate coating is developed until the image is clearly detailed, by the use of a solution of anhydrous ethyl alcohol containing 15 grams of castor oil and 35 ml. of glacial acetic acid.

*Example IV*

A gum arabic-ammonium dichromate photo-resist solution used in some of the following examples is made as follows: 720 cc. clear gum arabic solution of 14° Baumé is mixed thoroughly with 240 cc. ammonium dichromate aqueous solution containing 17 percent by weight ammonium dichromate, then 36 cc. of an ammonium hydroxide aqueous solution containing 28 percent by weight of ammonia is added and the mixture is sitrred carefully so as not to beat air into the solution; the resultant mixture is strained through 6 or 8 thicknesses of damp cheesecloth.

The developer used is made by the following procedure: 350 grams of zinc chloride is added to one litre of water; when this is dissolved, 700 grams of commercial calcium chloride ($CaCl_2 \cdot 2H_2O$) is next dissolved; then 160 cc. of 85 percent lactic acid is dissolved therein and water is added until the hydrometer reading is 41.4–41.5° Baumé at 78–80° F.

*Example V*

Two copper plates are treated in accordance with the procedure of Example I using the photo-resist of Example III: the first plate is coated as in Example I while at a temperature of about 125° F., and the second plate is coated while the plate is whirled at room temperature. The resist layer on the first plate dries much more quickly and has better adhesion than the resist layer on the second plate. After coating the remaining surfaces thickly with asphaltum, both plates are exposed to actinic light as in Example II, developed, and placed in the mordant solution. The hardened resist layer on the first plate is still in good condition when the desired depth of etch is attained. With the second plate, the hardened resist material is frayed and eaten away at the edges by the time the desired depth of etch is attained.

Brass plates treated as above give similar results.

*Example VI*

Two aluminum plates are treated in accordance with the procedure of Example I, using the photo-resist of Example III. The first plate is coated as in Example I while the plate is maintained at a temperature of about 125° F., and the second plate is coated while the plate is whirled at room temperature. The resist coating on the first plate dries in 4–5 minutes. The coating on the second plate takes 8–10 minutes to dry. The remaining surfaces of each are coated thickly with asphaltum. Upon exposing, developing, and placing both plates in a mordant solution as in Example I, the coating on the first plate gives much better protection against the mordant and much better reproduction in design than the second plate.

*Example VII*

Three copper plates are coated with the photo-resist composition of Example II with the following variations. The first plate is pretreated according to the procedure of Example I, but the resist composition is applied to the plate while both are at room temperature. The procedure of Example I is followed with the second plate. The third plate is not given any pretreatment except a light cleaning with pumice but the resist composition and the plate are maintained at about 125° F. during the application and drying. After drying, each of the coated plates is exposed and processed according to the procedure of Example I. The first and third plates have rather poor adhesion of the resist layer to the copper whereas the second plate shows excellent adhesion and upon etching in the mordant bath shows excellent detail in the etched design. Upon removal of the hardened resist and testing in offset printing the plate operates very satisfactorily. With the first and third plates, the hardened resist material is frayed and eaten away at the edges by the mordant solution by the time the desired depth of etching is obtained.

*Example VIII*

The procedure of Example VII is repeated with similar results when the shellac-dichromate resist of Example III is used in place of the resist of Example II.

*Example IX*

The procedure of Example VII is repeated using three aluminum plates. The coating on the second plate gives much better protection against the mordant and much better reproduction in design than does the coating on the first and third plates, and the plate operates very satisfactorily upon removal of the hardened resist and testing in offset printing.

*Example X*

Three plates of aluminum are processed according to the procedure of Example VIII. Again, excellent results are obtained with the second plate whereas unsatisfactory results are obtained with the first and third plates.

*Example XI*

The procedure of Example VII is repeated, using in place of the albumen-dichromate photo-resist an isopropyl benzene solution of light-sensitive bitumen, developing the exposed coating with turpentine and finally removing the hardened resist with benzol after the etching mordant treatment. Results similar to those in Example VII are obtained.

*Example XII*

The procedure of Example IX is repeated using a photo-resist of gum arabic-ammonium dichromate prepared according to Example IV. Similar results are obtained.

*Example XIII*

The procedure of Example I is repeated a number of times using a brass plate, a bronze plate, a magnesium plate, a manganese plate, an epoxy resin rigid board plated with chromium, an epoxy resin rigid board plated with nickel, an aluminum foil adhered to a rigid epoxy resin board, and copper foil adhered to a rigid epoxy resin board, respectively. In each case, the resist coating of Example II is used. After the ferric chloride mordant treatment and subsequent removal of the hardened resist coating, each of the plates has the image design reproduced in very fine detail. When the metal is a plating or foil, the design has been etched through to the plastic backing and the metal edges still are well adhered to the plastic backing. In each case the metal has substantially the same degree of lustre as the original metal. Similar results are obtained in each case when the procedure is repeated using the resist coating of Example III.

*Example XIV*

The procedure of Example XIII is repeated, using the resist coating of Example IV, and similar results are obtained.

*Example XV*

The procedure of Example XIII is repeated, using as the resist coating an isopropyl benzene solution of light-sensitive bitumen. The exposed coating is developed with turpentine and after the etching mordant treatment, the hardened resist is removed with benzol. Results similar to those of Example XIII are obtained.

*Example XVI*

The procedure of Example I is followed through the developing stage with the photo-resist of Example II, using a thin sheet (0.05 inch thick, 9 inches wide, and 20 inches long) of copper in one case and a thin sheet of aluminum of similar dimensions, in another case, both of which have previously been grained, as in the ordinary practice of preparing zinc plates for offset printing. After the developing stage, the plate is washed with alcohol and dried. However, instead of treating with mordant, as in Example I, the plate is used on a wet offset printing machine with the resist areas serving as the printing areas. After 50,000 copies of printed material have been run off, examination of the plate shows no defects in the printing surfaces of the plate.

In the practice of this invention, other photo-resist materials can be used and it is not necessary that the photo-resist material be one that is sensitive to actinic light. While actinic light-sensitive photo-resists are preferred, so that the operator can work in ordinary artificial light, it is suitable to use other photo-resist compositions, provided proper precautions are taken to avoid exposure of the plate during the coating, drying, and developing stages to the particular type of light to which the resist is sensitive. Such photo-resists sensitive to other types of light, as well as appropriate developers, are commercially available and are contemplated for the practice of this invention.

Moreover, it is also not necessary, except where a photographic process is being used, that a light-sensitive resist or protective coating be used to reproduce the desired design or image on the metal plate. For example, plates are satisfactorily produced by drawing a design directly on the plate while the plate is maintained at the desired temperature as indicated above for drying the resist to a tough, well-adhered coating. The resist or coating material necessarily must be one which is not affected by the etching solution for the period necessary to etch or eat away the metal to the desired depth and also gives good protection to the metal right at the contact edge of the resist and the metal against the etching solution. Likewise, a stencil or screen can be placed on the heated, metal plate and the resist or coating material applied through the open spaces of the stencil so that when the stencil is removed, the desired design is reproduced on the plate to give a tough, well-adhered resist, which after etching gives the desired design in the metal plate. Resist materials which can be used for drawing or stenciling include asphaltum, lacquers, paints, enamels, solutions of thermoplastic resins, etc. The solvents used in these materials obviously should have a flash point above the temperature of the plate and should be applied under a hood which will draw off vapors, or when solvents of low flash point are used, the application should be performed in an atmosphere of inert gas.

For example, a design is drawn on a copper or aluminum plate while maintained as in Example I at a temperature of about 125° F. using an isopropylbenzene solution of asphaltum. The sides, back, and other areas of the plate which are not to be etched are thickly coated with asphaltum, dried, and then placed in the mordant and further treated, with satisfactory results as in Example I.

While it is preferred in the practice of this invention that the resin coating be applied by spraying, it is also satisfactory to apply such coating by various other methods, such as spreading, or allowing the coating to run over the surface of the plate, or by placing the plate on a whirler, provided means are available to maintain the temperature of the plate within the desired range. The whirler can be equipped with a heating element under its surface, or can carry on it a heating element on which the plate will be placed. It also is possible in cases where the plate is of sufficient thickness to maintain the desired temperature by its own heat capacity, that a whirler can be used which does not have heating means. However, it is desirable to avoid the use of hot air blown onto the whirler or radiant heat from above to expedite drying, as is generally the practice. It is more desirable, as indicated above, that the heat for drying be supplied from the plate itself so that the resist is better adhered to the plate and is built up to a tougher thickness. Regardless of the method of applying the coating to the plate, it is desirable that a uniform, continuous coating be deposited on the plate. The thickness of the coating is generally in the same range as is presently applied to zinc and other types of plates. The thicker the coating, the greater is the time required for exposure to harden the coating, and the thinner it is, the shorter is the time required for exposure. However, the coating should not be so thin as to risk bare spots or uncoated areas on the metal.

The various types of metals indicated above can be used in the practice of this invention. This invention is particularly advantageous with respect to these metals since previously it has been found particularly difficult to obtain good adhesion of resist and other coating materials with such metals and also to retain substantially the same smooth surface and lustre of the metal. In addition to the metals listed above, it is intended to include non-ferrous alloys containing a major part of such metals within the scope of this invention. By non-ferrous alloys it is intended to include only those alloys of such metals having less than 10 percent, preferably less than about 3 percent by weight of iron, generally present as an impurity, and to exclude those alloys having substantial amounts of iron therein, such as 10 percent by weight or more of iron.

It is desirable that the various metals be in a clean condition when used in the practice of the invention. For example, it is desirable to remove any oxide coating, or rust, or oils from the surfaces of the metal. This can be done advantageously by cleaning the metal with water and pumice before use.

In addition to the various types of light-sensitive photo-resists disclosed above, various other types of photo-resist coatings can be used in the practice of this invention. Generally, with such other photo-resist materials, the temperature range indicated above for application and drying of said coating also is preferred. In some instances where such other coatings are applied at temperatures below this preferred temperature range the results are erratic, the adhesion of the coating being sometimes satisfactory but in any case the results are improved by the acid pretreatment of the metal surface as described above as compared with the metal not so pretreated. However, when the preferred temperature range is used, the adhesion is excellent in every case.

Typical examples of such other photo-resist materials that can be used in the practice of this invention include various light-sensitive polymers, such as polyvinyl cinnamates, light-sensitive alketone compositions, light-sensitive vinyl-substituted benzal acetophenones, styrene-maleic cinnamide copolymers, light-sensitive polymeric quaternary salts, etc., such as disclosed in U.S. Patents:

| | |
|---|---|
| 1,965,710 | 2,670,286 |
| 2,100,063 | 2,670,287 |
| 2,312,852 | 2,690,966 |
| 2,373,257 | 2,691,584 |
| 2,484,451 | 2,697,039 |
| 2,500,028 | 2,714,066 |
| 2,544,905 | 2,716,097 |
| 2,566,302 | 2,739,892 |
| 2,571,761 | 2,751,373 |
| 2,610,120 | 2,760,863 |
| 2,670,285 | 2,908,667 |

It has been found that by the practice of this invention excellent results can be obtained using less expensive dichromate albumen types of resists. Moreover, results with the polyvinyl cinnamate and other types of resists also are improved. For example, the instructions on one of the polyvinyl cinnamate commercially available compositions recommend baking the resist as one of the final steps to insure adhesion of the resist to the metal. It has been found that excellent adhesion to the metal is obtained with that commercial product without the baking step when applied according to the process of this invention.

The following examples illustrate the use of additional resist compositions.

*Example XVII*

Two copper plates are pretreated in accordance with the procedure of Example I. A third plate of the same type merely is cleaned with pumice. Under subdued light, one of the acid-pretreated plates is coated with the polymethyl methacrylate-difurfural cyclopentanone resist composition shown in Example 1 of U.S. Patent No. 2,544,905, in accordance with the procedure of that example while the plate is at room temperature. The second acid-pretreated plate is coated similarly except that the plate is maintained at a temperature of approximately 125° F. during the coating and drying. The third plate which has received only the pumice cleaning treatment is coated similarly while the plate is maintained at about 125° F.

After drying, each of the coated plates is exposed in accordance with the exposure procedure described above in Example I. In each case, the exposed plate is developed in accordance with the procedure of Example I of the aforesaid patent and is then etched in a mordant comprising 40° Baumé ferric chloride solution agitated at 80° F. for a period of about one hour. A comparison of the resist coatings on the respective plates shows erratic results with the first plate, some areas being satisfactorily adhered and certain spots well adhered. Very excellent results are obtained with the second plate, which has received both the pretreatment and the resist application and drying at raised temperature. The third plate, which did not have the acid-pretreatment shows unsatisfactory adhesion of the resist layer. Processing of the second plate with ferric chloride solution and subsequent removal of the resist layer gives an etched image of fine detail.

*Example XVIII*

Similar results are obtained when the procedure of Example XVII is repeated using plates of brass and bronze, respectively.

*Example XIX*

The procedure of Example XVII is repeated with similar results using aluminum plates and using the alketone photo-resist composition of Example 2 of the aforesaid patent, wherein ethyl cellulose is used in place of the polymethyl methacrylate.

*Example XX*

Two magnesium plates are acid-pretreated in accordance with the procedure of the above Example I and a third similar plate merely is cleaned very lightly with pumice. Under subdued light, each of the three plates is given a very thin coating of a composition prepared according to the example of U.S. Patent 2,610,120, and containing 25 grams of polyvinyl cinnamate, 25 cc. of chlorobenzene, 75 cc. of toluene, and 0.25 gram of 2,4,6-trinitroaniline.

The coating is applied to the first pretreated plate while the plate is at room temperature, to the second pretreated plate while it is maintained at about 125° F., and to the third, or untreated plate, while it also is maintained at about 125° F. After drying, each of the plates is exposed under an image negative at four feet from a 35-ampere white flame carbon arc for about one minute. Then the exposed plate is developed in each case for two minutes in a tray of methylethylketone. While the resist coating on the first plate is erratic, as described in Example XVII, that on the second plate shows excellent adhesion. The third plate shows very poor adhesion. Treatment of the second plate in a ferric chloride mordant bath and subsequent removal of the hardened resist results in well-defined images in the stainless steel surface.

*Example XXI*

Similar results are obtained when the procedure of Example XVII is repeated using as the resist coating the composition of the example in U.S. Patent 2,670,285, which contains 2.5 grams of polyvinyl cinnamate, 100 cc. of methyl glycol acetate, 0.25 gram of 2-keto-3-methyl-1,3-diazabenzanthrone, and using methylethylketone as the developer.

*Example XXII*

Similar results also are obtained when the procedures of Examples XVII and XIX are repeated using the resist coating composition shown in Example 1 of U.S. Patent 2,670,286, containing 2.5 grams of polyvinyl cinnamate, 100 cc. of methyl glycol acetate, and 0.25 gram of 1,2-benzanthraquinone, and using methyl ethyl ketone as the developer.

*Example XXIII*

Similar results also are obtained when the procedures of Examples XVII and XIX are repeated using the resist coating composition shown in the example of U.S. Patent 2,670,287, containing 2.5 grams of polyvinyl cinnamate, 100 cc. of methyl glycol acetate, and 0.25 gram of 4,4'-tetramethyldiaminodiphenyl ketone, and using methylethylketone as the developer.

*Example XXIV*

Similar results also are obtained when the procedure of Example XVII is repeated using magnesium plates and using as the resist coating the composition shown in column 4 of U.S. Patent 2,690,966, containing 5 grams of polyvinyl cinnamate, 0.25 gram of crystal violet carbinol base, 40 cc. of xylene, 40 cc. of toluene, 10 cc. of n-butyl alcohol, and 20 cc. of i-propyl alcohol.

*Example XXV*

Similar results also are obtained when the procedure of Example XVII is followed except that the resist coating is a methylethylketone solution of a polyvinyl acetophenone-anisaldehyde condensation product produced according to Example 3 of Patent 2,716,097, and methylethylketone is used as the developer.

*Example XXVI*

The procedure of Example XVII is repeated with similar results using aluminum plates and using as the coating composition a pyridine solution of the light-sensitive material prepared according to Example 1 of U.S. Patent 2,751,373, comprising the reaction product of styrene-maleic anhydride copolymer with N-(m-hydroxymethylphenyl)-cinnamides sensitized by 2-benzoylmethylene-1-methyl-beta-naphthyl-thiazoline, and using pyridine as the developer.

*Example XXVII*

The procedure of Example XVII is repeated with similar results using a 0.75 percent solution of the light-sensitive polymeric quaternary ammonium salt prepared according to Example 7 of the U.S. Patent 2,908,667, comprising the reaction product of anisaldehyde with the reaction product of 4-picoline and the quaternary salt of polyvinyl-p-toluene sulfonate. The solvent used in the coating composition is an equal volume mixture of water and ethanol, and the same solvent is used to develop the exposed coating after removing unhardened portions of the coating.

*Example XXVIII*

The procedure of Example 1 of U.S. Patent 2,760,863 is followed, without the primer coat of that example, in applying a light-sensitive coating directly on two copper plates, the first of which is pretreated as in Example I herein and is maintained at about 125° F. during the application and processing steps, and the second plate merely is cleaned with pumice and maintained at room temperature during the processing. The coating of the described mixture of 55 parts methylmethacrylate monomer, 25 parts polymethylmethacrylate, 20 parts of monomeric polyethylene glycol dimethacrylate, and one part benzoin are applied and processed in accordance with the procedure described in Example 1 of the aforesaid patent. The adhesion of the hardened areas of the pretreated plate is distinctly superior to that of the hardened areas on the other plate.

Similar results are obtained when this procedure is repeated on aluminum plates.

*Example XIX*

The procedure of Example I herein is followed in the pretreating of two copper plates, and a third similar plate merely is cleaned with a light rubbing of pumice. Using a silver bromide-gelatin emulsion normally used in the preparation of photographic film as the resist composition, a thin layer is applied to each of the plates. Under dark red light in each case, the coating is applied to the first plate at room temperature, and to the second and third plates at about 125° F. in accordance with the procedure of Example I. Then each of the plates is covered with an image negative and exposed for 7 seconds to a 100-watt incandescent light at 3 feet distance. Each plate then is developed and the unexposed areas washed away with hydroquinone solution, and the exposed areas then are fixed with hypo solution containing sodium sulphite and alum. After drying each of the plates is examined. The first and third plates show such poor adhesion that they cannot be treated in the mordant. The second plate showed satisfactory adhesion and upon etching in ferric chloride solution gave satisfactory detail in the etched design. Although the results are not as excellent as those with the other resists described herein, they show improved adhesion effected by the present invention.

Similar results are obtained when the procedure is repeated using aluminum and magnesium plates respectively, and also when repeated with silver chloride and silver iodide photographic emulsions respectively.

*Example XXX*

The pretreating and coating procedure of Example XXIX is repeated in applying a resist coating to three aluminum plates. The resist composition is applied directly to the metal and is a one percent water solution of the light-sensitive diazo resin prepared according to the first complete paragraph at the top of column 7 of U.S. Patent 2,714,066. After the resist has been applied and dried under subdued light, each plate is exposed under a negative image to light from a 35-ampere carbon arc light at 24 inches for 1.5 minutes. The exposed plate in each case is processed immediately after the coating has dried according to the directions of the second full paragraph of column 8 of the aforesaid patent. The second plate is the only one of the three on which the resist coating has adhered satisfactorily. This plate immediately is placed in a mordant bath of ferric chloride and the design etched in the metal gives excellent detail. When the foregoing procedure is repeated using ultraviolet light, fluorescent tube "black light," and light from a photo-flood bulb respectively, in place of the carbon arc light, similar results are obtained. Also, when the foregoing procedure is repeated using aluminum and magnesium plates respectively, similar results are obtained.

It is possible by the practice of this invention to etch to depths of 0.015 inch or deeper while maintaining accuracy and fidelity of details in the image. It has been found that the practice of this invention permits such accurate reproduction of image that it is possible to produce plates from which half-tones can be printed since the sizes of the dots used for such purposes are easily controlled.

Moreover as previously indicated, designs can be etched in the surfaces of cylindrical rolls by the practice of this invention, as well as in the flat and cylindrical surfaces of molds. This can be accomplished according to the foregoing procedures by wrapping the image-bearing transparency around the resist-coated cylinder, or cutting the transparency to the proper size and laying it in the proper resist-coated area of a mold. In the pretreatment step the cylinder or mold can be preheated to the desired temperature and generally the heat capacity of the metal article will keep it in the desired temperature range long enough for the resist to dry. In the case of hollow cylinders, a heating means can be inserted inside the cylinder.

The term "image" as used herein is intended in a broad sense to include printing, diagrams, drawings, pictures, etc.

With respect to the photo-resist materials being used in the practice of this invention, the type of light, the strength and the duration of the light exposure will obviously all be determined by the type of resist material being used. In view of the tougher resist coating produced by the practice of this invention, it is generally necessary to use slightly longer exposure than is used with resist applied according to prior practice. For example, where certain resists are used in other processes with an exposure time of 2–4 minutes, an exposure time of 5–7 minutes is desirable when such resists are used according to this invention.

Moreover, the type of developer and the type of mordant to be used will be determined by the type of resist or protective coating. Obviously, the developer must be one which will soften and remove the unhardened coating while at the same time not damaging or removing the hardened resist. Manufacturers and suppliers of commercial resist materials generally recommend and supply the developer that should be used with their particular resist materials. As indicated above, ferric chloride solution (38–44° Baumé, preferably 40–42°) generally is preferred as the mordant for use in the practice of this invention. However, other mordants which will attack the metal can also be used, provided the resist is inactive toward that particular mordant. Other mordants which can be used with particular resist materials inactive to the mordant are nitric acid, acetic acid, solutions of hydrogen chloride in alcohol or glycerine, ferric chloride solutions containing minor amounts of hydrogen chloride, etc.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A process for treating a metal selected from the class consisting of copper, aluminum, magnesium, nickel, chromium, and non-ferrous alloys thereof containing a major proportion of said metals, for improving the receptivity of an adhesive coating on said metal which comprises the steps of treating the surface of said metal by intimate contact with aqueous hydrochloric acid solution consisting essentially of 30–53 grams of hydrogen chloride per gallon of solution while said metal is maintained at a temperature of about 100° F. to 140° F. for a period of about 1 to 6 minutes, and removing said solution therefrom, said hydrochloric acid solution with respect to copper being as low as about 12 grams of hydrogen chloride per gallon of solution, and said treating period with respect to copper being as low as one-half minute.

2. A process of claim 1 in which the acid concentration is about 44–50 grams of hydrogen chloride per gallon of solution and the temperature range is about 120° F. to 140° F.

3. A process for applying to a metal selected from the class consisting of copper, aluminum, magnesium, nickel, chromium, and non-ferrous alloys thereof containing a major portion of said metals, a coating of a resist selected from the class consisting of dichromate light-sensitive resists, light-sensitive bitumen, light-sensitive polyvinyl cinnamate, light-sensitive diazo resins, light-sensitive silver salt emulsions, light-sensitive vinyl monomer-polymer mixtures, light-sensitive polymeric quaternary ammonium salt resins, and asphaltum, comprising the steps of: (1) pretreating the surface of said metal for a period of about 1 to 6 minutes with aqueous hydrochloric acid solution consisting essentially of 30–50 grams of hydrogen chloride per gallon of solution while the metal is maintained at a temperature of about 100° F. to 140° F.; and (2) thereafter applying the coating to the metal while the metal is maintained at a temperature in the range of about 100° F. to 140° F., said hydrochloric acid solution with respect to copper being as low as about 12 grams of hydrogen chloride per gallon of solution, and said treating period with respect to copper being as low as one-half minute.

4. A process of claim 3 in which the acid concentration is about 44–50 grams of hydrogen chloride per gallon of solution.

5. A process of claim 3 in which the temperature is about 120° F. to 140° F.

6. A process of claim 3 in which the coating is subsequently exposed to the type of light to which it is sensitive in such a manner as to produce the desired image thereon.

7. A process of claim 3 in which said resist is a dichromate photo-resist.

8. A process of reproducing an image in the surface of a metal selected from the class consisting of copper, aluminum, magnesium, nickel, chromium, and non-ferrous alloys thereof containing a major proportion of said metals, comprising the steps: (1) treating the surface of the metal with hydrochloric acid solution containing about 30–53 grams of hydrogen chloride per gallon of solution while the metal is maintained at a temperature of about 100° F. to 140° F. for a period of about 1 to 6 minutes; (2) subsequently applying a coating of a photo-resist material selected from the class consisting of light-sensitive dichromate resists, light-sensitive polyvinyl cinnamate, light-sensitive bitumen, light-sensitive diazo resins, light-sensitive silver salt emulsions, light-sensitive vinyl monomer-polymer mixtures, and light-sensitive polymeric quaternary ammonium salt resins, while said metal is maintained at a temperature in the range of about 100° F. to 140° F.; (3) allowing said coating to dry; (4) exposing said coating to light of the type to which said photo-resist coating is sensitive in such a manner that different amounts of light striking different areas of said coating reproduce the desired image thereon; (5) placing in contact with said exposed photo-resist coating a developer which softens and makes removable that part of the photo-resist coating which did not receive light during exposure; and (6) removing the softened coating from the metal in the softened areas; said hydrochloric acid solution with respect to copper being as low as about 12 grams of hydrogen chloride per gallon of solution, and said treating period with respect to copper being as low as one-half minute.

9. A process of claim 8 in which the exposed metal surfaces from which said softened coating has been removed are placed in contact with a mordant solution which etches said exposed surfaces.

10. A process of claim 8 in which said photo-resist comprises albumen and ammonium dichromate.

11. A process of claim 8 in which said photo-resist comprises shellac and ammonium dichromate.

12. A process of claim 8 in which said photo-resist comprises a light-sensitive polyvinyl cinnamate composition.

13. A process of claim 8 in which said photo-resist comprises gum arabic and ammonium dichromate.

14. A process of claim 8 in which said exposed metal surfaces from which said softened coating has been removed are placed in contact with an aqueous solution of ferric chloride.

15. A process of claim 14 in which said ferric chloride solution is 38–44° Baumé.

16. A process of claim 14 in which said metal is copper.

17. A process of claim 14 in which said metal is aluminum.

18. A process of claim 14 in which said metal is magnesium.

19. A process of claim 14 in which said metal is chromium.

(References on following page)

References Cited by the Examiner

UNITED STATES PATENTS

| | | | |
|---|---|---|---|
| Re. 9,608 | 3/81 | Roche | 96—86 |
| 218,137 | 8/79 | Roche | 96—86 |
| 2,193,711 | 12/37 | Burnham | 252—79.2 |
| 2,344,510 | 3/44 | Hagelin. | |
| 2,796,334 | 6/57 | Robinson | 252—79.2 |
| 3,020,175 | 2/62 | Penczek et al. | 117—49 |
| 3,085,008 | 4/63 | Case | 96—75 |

OTHER REFERENCES

Mertle et al.: Photomechanics and Printing, 1957, Mertle Publishing Co., Chicago, Ill., pp. 157–159 cited.

NORMAN G. TORCHIN, *Primary Examiner.*

PHILIP E. MANGAN, *Examiner.*